(12) United States Patent
Chou et al.

(10) Patent No.: US 8,190,100 B2
(45) Date of Patent: May 29, 2012

(54) RADIO FREQUENCY CIRCUIT FOR A WIRELESS SIGNAL TRANSCEIVER AND RELATED WIRELESS SIGNAL TRANSCEIVER

(75) Inventors: Jui-Hsiang Chou, Taipei Hsien (TW); Cheng-Hsiung Hsu, Taipei Hsien (TW); Chia-Ming Wang, Taipei Hsien (TW)

(73) Assignee: Wistron NeWeb Corporation, Hsi-Chih, Taipei Hsien (TW)

( * ) Notice: Subject to any disclaimer, the term of this patent is extended or adjusted under 35 U.S.C. 154(b) by 393 days.

(21) Appl. No.: 12/629,060

(22) Filed: Dec. 2, 2009

(65) Prior Publication Data
US 2010/0159826 A1   Jun. 24, 2010

(30) Foreign Application Priority Data
Dec. 23, 2008 (TW) .................. 97150294 A

(51) Int. Cl.
*H04B 1/38* (2006.01)
(52) U.S. Cl. ....... 455/73; 455/550.1; 455/23; 455/553.1
(58) Field of Classification Search .............. 455/12.1, 455/3.02, 14, 23, 24, 83, 84, 550.1, 552.1, 455/126, 275, 276.1, 277.1, 551, 73, 556.1, 455/553.1, 88
See application file for complete search history.

(56) References Cited

U.S. PATENT DOCUMENTS

| 5,864,579 A | 1/1999 | Briskman |
|---|---|---|
| 6,373,349 B2 | 4/2002 | Gilbert |
| 2006/0276158 A1* | 12/2006 | Okabe .................. 455/333 |
| 2007/0281626 A1 | 12/2007 | Dobosz |
| 2009/0202019 A1* | 8/2009 | Rofougaran .......... 375/298 |
| 2009/0233642 A1* | 9/2009 | Zhitnitsky ........... 455/552.1 |

* cited by examiner

*Primary Examiner* — John J Lee
(74) *Attorney, Agent, or Firm* — Winston Hsu; Scott Margo

(57) ABSTRACT

A radio-frequency circuit for a wireless signal transceiver is disclosed. The wireless signal transceiver is utilized for receiving a first wireless signal and transforming the first wireless signal into a second wireless signal. The radio-frequency circuit includes a transmission line including a first end and a second end, a reception antenna coupled to the first end of the transmission line for receiving the first wireless signal, a transmission antenna coupled to the first end of the transmission line for emitting the second wireless signal, a first filtering circuit coupled between the second end of the transmission line and the wireless signal transceiver for filtering out the first wireless signal, and a second filtering circuit coupled between the second end of the transmission line and the wireless signal transceiver for filtering out the second wireless signal.

18 Claims, 3 Drawing Sheets

RADIO FREQUENCY CIRCUIT FOR A WIRELESS SIGNAL TRANSCEIVER AND RELATED WIRELESS SIGNAL TRANSCEIVER

BACKGROUND OF THE INVENTION

1. Field of the Invention

The present invention is related to a radio-frequency circuit for a wireless signal transceiver and related wireless signal transceiver, and more particularly, to a radio-frequency circuit and related wireless signal transceiver for ensuring the efficiency of antenna to avoid mutual interference of wireless signals.

2. Description of the Prior Art

Satellite Radio is a $3^{rd}$ generation broadcasting technique following Amplitude Modulation (AM) and Frequency Modulation (FM) broadcasting techniques. The satellite radio technique solves the lack of available broadcasting channels with better spectral utilization efficiency. Moreover, CD-like sound quality and supplementary digital data service fit the diversification of broadcasting media. Therefore, the analog broadcasting system tends to be replaced by the satellite radio system.

Techniques utilized by the satellite radio system, such as modulation and coding, are greatly different from those utilized by the conventional AM and FM broadcasting systems. Hence, the conventional AM and FM demodulators, such as radio players, cannot be used in the satellite radio system. In other words, a user needs to purchase a satellite radio demodulator for receiving digital broadcasting programs. However, a vehicle multimedia system is integrated with a vehicle housing or interior, such that the user cannot receive the satellite radio programs in a car by replacing a satellite radio demodulator, causing inconvenience.

In consequence, the prior art has provided a vehicle satellite radio receiver, which is compatible with the vehicle FM demodulator, and combines a satellite radio demodulator and a FM transmitter, for transforming satellite radio signals into FM signals for the vehicle FM demodulator, allowing the user to play the satellite radio programs via a vehicle audio system. For example, please refer to FIG. 1. FIG. 1 is a schematic diagram of a vehicle satellite radio receiver 10 in the prior art. The vehicle satellite radio receiver 10 comprises a satellite reception antenna 100, a satellite radio demodulation module 102, an audio signal processing module 104, a FM modulation module 106, and a FM transmission antenna 108. Satellite radio signal is received by the satellite reception antenna 100 and transformed into baseband audio signal for the audio signal processing module 104 via the satellite demodulation module 102. The audio signal processing module 104 can send out the satellite radio content via a connected speaker or headset (not shown in FIG. 1). Or, the satellite radio content can also be transformed into FM signal by the FM modulation module 106 and emitting into the air through the transmission antenna 108. In other words, the vehicle satellite radio receiver 10 can emit the satellite radio content to the vehicle FM demodulator in the form of FM signal, allowing the user to receive the satellite radio programs without replacing the original vehicle multimedia system.

Consequently, the user can listen to the satellite radio programs by the vehicle satellite radio receiver 10 instead of replacing the original vehicle multimedia system. However, as shown in FIG. 1, the vehicle satellite radio receiver 10 needs at least two transmission lines L_1 and L_2 to transfer satellite signal and FM signal respectively. Such design is not neat and may easily cause inconvenience for the user. If the transmission lines L_1 and L_2 are fixed or tied together, the effect of FM transmission might be affected. The main reason is, the communication administration (e.g. Federal Communications Commission, FCC) in every country makes rules on the radiation power of FM channels. Under the circumstances of the confined radiation power, the FM signal emitted by the FM transmission antenna 108 is easily interfered, so that the transmission line L_1 and L2 cannot be fixed or tied together.

In short, the common vehicle satellite radio reception needs at least two transmission lines to transmit the satellite signal and the FM signal, easily causing a messy condition and inconvenience for the user.

SUMMARY OF THE INVENTION

It is therefore a primary objective of the claimed invention to provide a radio-frequency circuit for a wireless signal transceiver and related wireless signal transceiver.

An embodiment of the invention discloses a radio-frequency circuit for a wireless signal transceiver and related wireless signal transceiver. The wireless signal transceiver is utilized for receiving a first wireless signal and transforming the first wireless signal into a second wireless signal. The radio-frequency circuit comprises a transmission line comprising a first end and a second end, a reception antenna coupled to the first end of the transmission line for receiving the first wireless signal, a transmission antenna coupled to the first end of the transmission line for emitting the second wireless signal, a first filtering circuit coupled between the second end of the transmission line and the wireless signal transceiver for filtering out the first wireless signal, and a second filtering circuit coupled between the second end of the transmission line and the wireless signal transceiver for filtering out the second wireless signal.

An embodiment of the invention further discloses a radio-frequency circuit for a wireless signal transceiver, which comprises a demodulation module for demodulating a first wireless signal and generating a demodulation result, a processing module coupled to the demodulation module for processing the demodulation result of the demodulation module and generating a processing result, a modulation module coupled to the processing module for modulating the processing result of the processing module and generating a second wireless signal, and a radio-frequency circuit. The radio-frequency circuit comprises a transmission line comprising a first end and a second end, a reception antenna coupled to the first end of the transmission line for receiving the first wireless signal, a transmission antenna coupled to the first end of the transmission line for emitting the second wireless signal, a first filtering circuit coupled between the second end of the transmission line and the demodulation module for filtering the first wireless signal, and a second filtering circuit coupled between the second end of the transmission line and the modulation module for filtering the second wireless signal.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
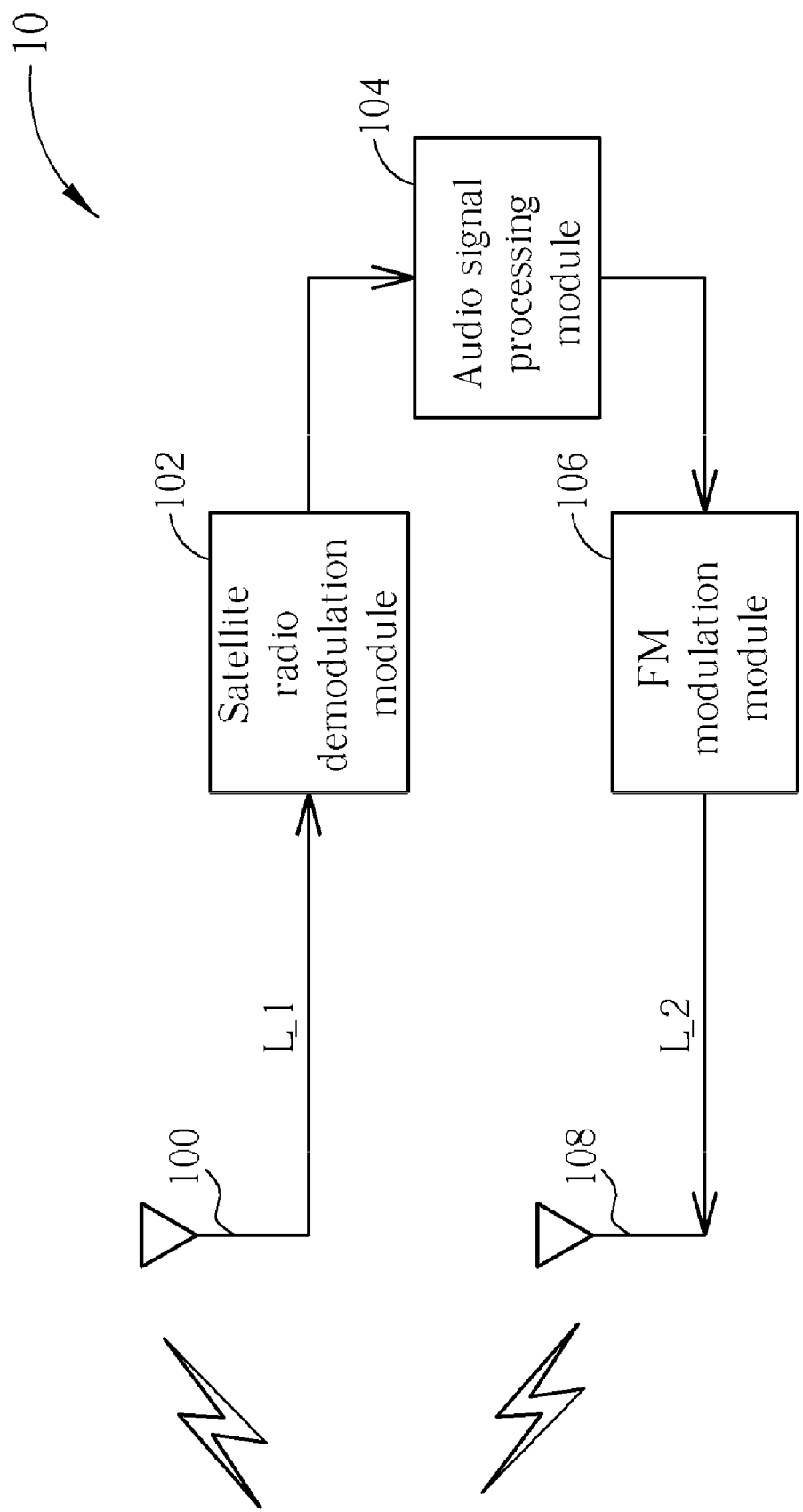
FIG. 1 is a schematic diagram of a vehicle satellite receiver in the prior art.
Figure 2:
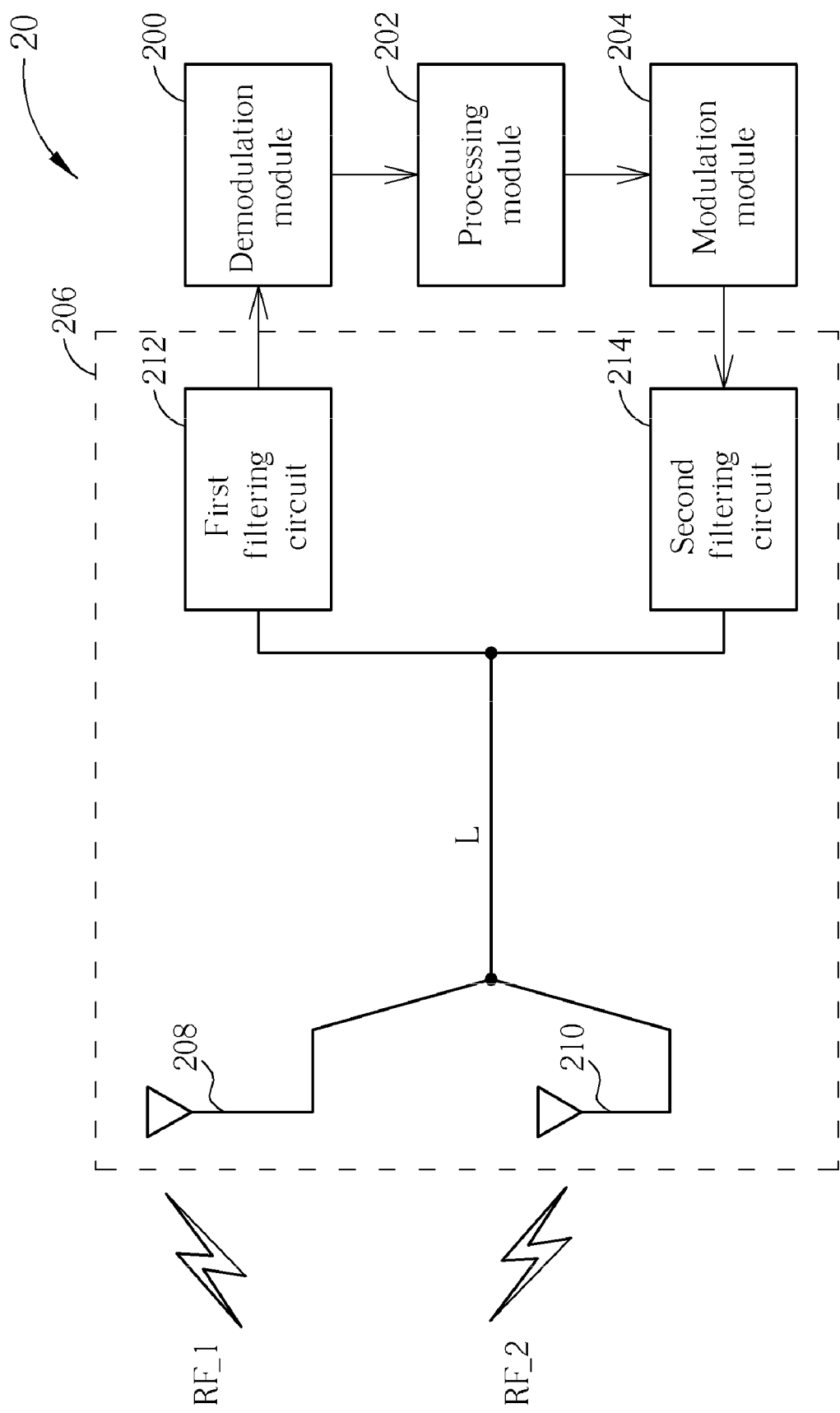
FIG. 2 is a schematic diagram of a wireless signal transceiver according to an embodiment of the invention.

Please refer to FIG. 2, which is a schematic diagram of a wireless signal transceiver 20 in accordance with an embodiment of the invention. The wireless signal transceiver 20 preferably realizes a vehicle satellite receiver for transforming the satellite radio content into FM signals and emitting the FM signals to a vehicle FM demodulator. The wireless signal transceiver 20 comprises a demodulation module 200, a processing module 202, a modulation module 204 and a radio-frequency (RF) circuit 206. The RF circuit 206 is utilized for processing RF signals, and comprises a reception antenna 208, a transmission antenna 210, a transmission line L, a first filtering circuit 212 and a second filtering circuit 214. The operation of the wireless signal transceiver 20 is as follows. First, the reception antenna 208 receives and transmits a wireless signal RF_1 to the first filtering circuit 212 via the transmission line L. The first filtering circuit 212 performs filtering operation, to filter out the wireless signal RF_1 for the demodulation module 200. Operations of the demodulation module 200, the processing module 202 and the modulation module 204 are similar to those of the satellite radio demodulation module 102, the audio signal processing module 104 and the FM modulation module 106 shown in FIG. 1. That is, the demodulation module 200 is utilized for demodulating the wireless signal RF_1, the processing module 202 is utilized for processing the demodulation result of the demodulation module 200, and the modulation module 204 is utilized for modulating the processing result of the modulation module 202 and generating a wireless signal RF_2. The second filtering circuit 214 can execute filtering operation, to filter out the wireless signal RF_2 and transmit the wireless signal RF_2 to the transmission antenna 210 via the transmission line L, so as to emit the wireless signal RF_2 to the air.

In short, in the wireless signal transceiver 20, the RF circuit 206 simply requires a single transmission line L with the filtering operations of the first filtering circuit 212 and the second filtering circuit 214, to receive the wireless signal RF_1 via the reception antenna 208 and emit the wireless signal RF_2 via the transmission antenna 210. Under such circumstances, the invention can reduce the messy condition due to at least two transmission lines of the prior art, and maintain the reception and transmission efficiency of the reception antenna 208 and the transmission antenna 210, to prevent mutual interference between the wireless signals RF_1 and RF_2. Preferably, the wireless signal RF_1 is a satellite radio signal and the wireless signal RF_2 is a FM signal.

As mentioned above, since a vehicle multimedia system is integrated in a vehicle housing or interior, the user cannot replace the satellite radio demodulator to receive satellite radio programs in the vehicle. In such a situation, via the wireless signal transceiver 20 of the invention, satellite radio content is transformed into FM signals for the vehicle FM demodulator. Owing to the RF circuit 206 requiring only one transmission line L, the invention can eliminate the messy condition and enhance convenience. Moreover, combining with the filtering operations of the first filtering circuit 212 and the second filtering circuit 214, the RF circuit 206 can stabilize the reception and transmission efficiency of the reception antenna 208 and the transmission antenna 210 from mutual interference in order to enhance signal quality.

Figure 3:
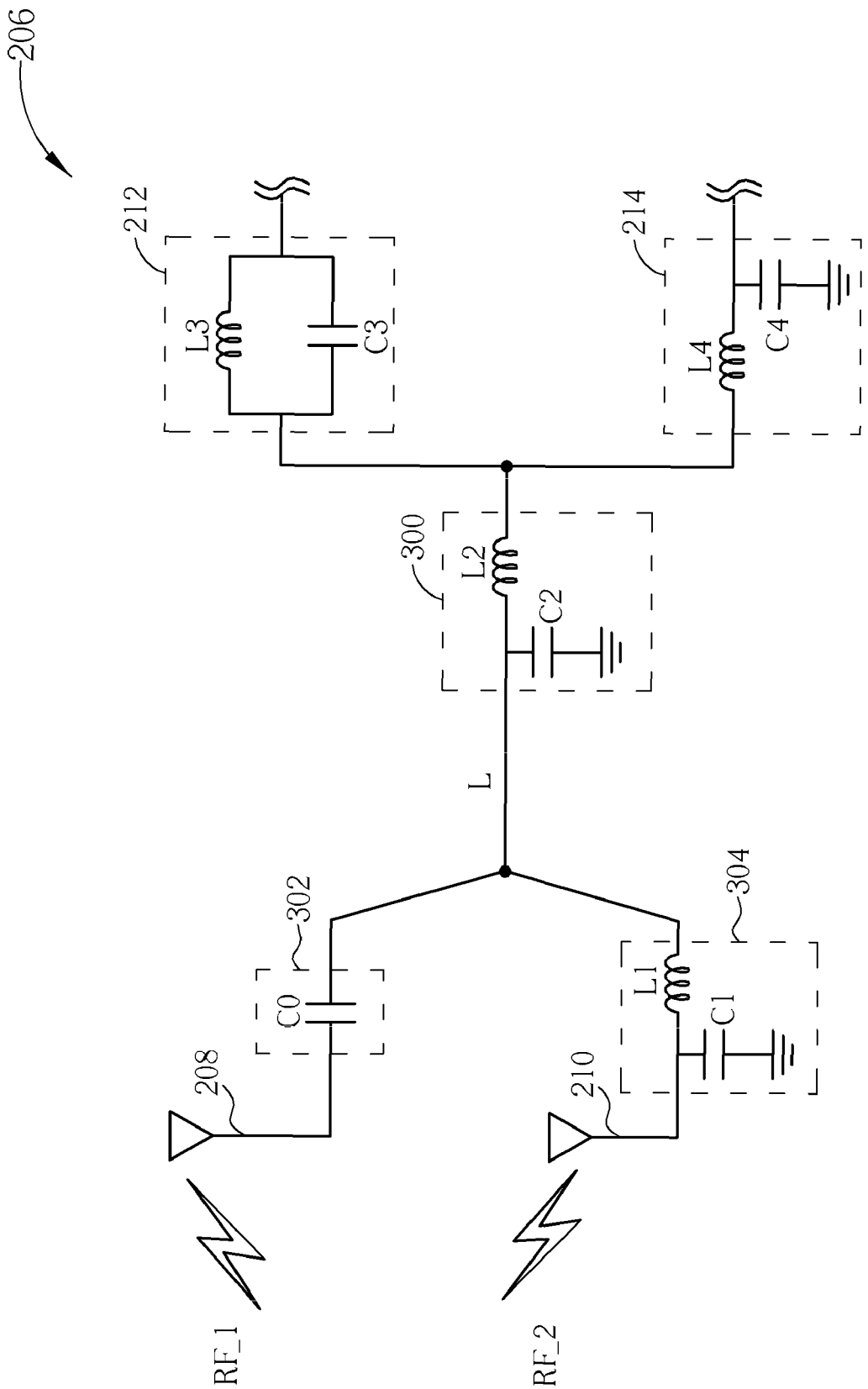
FIG. 3 is a schematic diagram of a radio-frequency circuit of FIG. 2 according to an embodiment of the invention.

Note that, FIG. 1 is the schematic diagram of an embodiment of the invention, and those skilled in the art can make alterations and modifications accordingly. For example, please refer to FIG. 3, which is a schematic diagram according to an alternative embodiment of the RF circuit shown in FIG. 2. In FIG. 3, the first filtering circuit 212 consists of an inductor L3 and a capacitor C3, and the second filtering circuit 214 consists of an inductor L4 and a capacitor C4. Besides, a matching circuit 300 and filtering circuits 302 and 304 are added into the RF circuit 206. The matching circuit 300 consists of an inductor L2 and a capacitor C2 for executing matching process. The filtering circuit 302 is realized by a capacitor C0, formed between the reception antenna 208 and the transmission line L, and utilized for filtering the wireless signal RF_1. The filtering circuit 304 consists of an inductor L1 and a capacitor C1, located between the transmission antenna 210 and the transmission line L, and utilized for filtering the wireless signal RF_2.

In addition, the characteristic of each unit in FIG. 3, such as the capacitance values of the capacitors C0, C1, C2, C3 and C4, and the inductance values of the inductors L1, L3 and L4, should match frequencies, bandwidths, etc. of the wireless signals RF_1 and RE_2. Furthermore, FIG. 3 only reveals one possible alteration of the RF circuit 206, and those skilled in the art can make alterations and modifications according to system requirement.

In the prior art, under the condition of confined radiation power, the vehicle satellite receiver transmits satellite signals and FM signals via two transmission lines, causing the messy condition and inconvenience. In comparison, the invention ensures the reception and transmission efficiency of the reception antenna 208 and the transmission antenna 210 via the first filtering circuit 212 and the second filtering circuit 214, to prevent signal mutual interference, and merely requires one transmission line L to transmit satellite signals and FM signals, to avoid the messy condition and increase convenience.

In summary, using the filtering operations of the first filtering circuit 212 and the second filtering circuit 214, the invention only requires one transmission line L to receive the wireless signal RF_1 via the reception antenna 208 and transmit the wireless signal RF_2 via the transmission antenna 210. Under such circumstances, the messy condition can be eliminated, and the reception and transmission efficiency of the reception antenna 208 and the transmission antenna 210 can also be maintained to avoid the mutual interference between the wireless signals RF_1 and RF_2.

Those skilled in the art will readily observe that numerous modifications and alterations of the device and method may be made while retaining the teachings of the invention.

What is claimed is:

1. A radio-frequency circuit for a wireless signal transceiver utilized for receiving a first wireless signal and transforming the first wireless signal into a second wireless signal, the radio-frequency circuit comprising:

a transmission line, comprising a first end and a second end;

a reception antenna, coupled to the first end of the transmission line, for receiving the first wireless signal;

a transmission antenna, coupled to the first end of the transmission line, for emitting the second wireless signal;

a first filtering circuit, coupled between the second end of the transmission line and the wireless signal transceiver, for filtering out the first wireless signal;

a second filtering circuit, coupled between the second end of the transmission line and the modulation module, for filtering out the second wireless signal and a matching circuit, coupled to the second end of the transmission line, the first filtering circuit and the second filtering circuit.

2. The radio-frequency circuit of claim 1, wherein the first filtering circuit comprises:
   an inductor, coupled between the second end of the transmission line and the wireless signal transceiver; and
   a capacitor, coupled between the second end of the transmission line and the wireless signal transceiver.

3. The radio-frequency circuit of claim 1, wherein the second filtering circuit comprises:
   a capacitor, coupled between the wireless signal transceiver and a ground end; and
   an inductor, having one end coupled to the second end of the transmission line, and the other end coupled to the capacitor and the wireless signal transceiver.

4. The radio-frequency circuit of claim 1, wherein the matching circuit comprises:
   a capacitor, coupled between the first end of the transmission line and a ground end; and
   an inductor, having one end coupled to the first end of the transmission line and the capacitor, and the other end coupled to the second end of the transmission line, the first filtering circuit and the second filtering circuit.

5. The radio-frequency circuit of claim 1 further comprising a filtering circuit, coupled between the reception antenna and the first end of the transmission line.

6. The radio-frequency circuit of claim 5, wherein the filtering circuit is a capacitor.

7. The radio-frequency circuit of claim 1 further comprising a filtering circuit, coupled between the transmission antenna and the first end of the transmission line.

8. The radio-frequency circuit of claim 7, wherein the filtering circuit comprises:
   a capacitor, coupled between the transmission antenna and a ground end; and
   an inductor, having one end coupled to the first end of the transmission line, and the other end coupled to the transmission antenna and the capacitor.

9. The radio-frequency circuit of claim 1, wherein the first wireless signal is a satellite radio signal and the second wireless signal is a frequency modulation broadcast signal.

10. A wireless signal transceiver comprising:
    a demodulation module, for demodulating a first wireless signal, to generate a demodulation result;
    a processing module, coupled to the demodulation module, for processing the demodulation result of the demodulation module, to generate a processing result;
    a modulation module, coupled to the processing module, for modulating the processing result of the processing module, to generate a second wireless signal; and
    a radio-frequency circuit, comprising:
    a transmission line, comprising a first end and a second end;
    a reception antenna, coupled to the first end of the transmission line, for receiving the first wireless signal;
    a transmission antenna, coupled to the first end of the transmission line, for emitting the second wireless signal;
    a first filtering circuit, coupled between the second end of the transmission line and the demodulation module, for filtering out the first wireless signal; and
    a second filtering circuit, coupled between the second end of the transmission line and the modulation module, for filtering out the second wireless signal and
    a matching circuit, coupled to the second end of the transmission line, the first filtering circuit and the second filtering circuit.

11. The wireless signal transceiver of claim 10, wherein the first filtering circuit comprises:
    an inductor, coupled between the second end of the transmission line and the demodulation module; and
    a capacitor, coupled between the second end of the transmission line and the demodulation module.

12. The wireless signal transceiver of claim 10, wherein the second filtering circuit comprises:
    a capacitor, coupled between the modulation module and a ground end; and
    an inductor, having one end coupled to the second end of the transmission line, and the other end coupled to the capacitor and the modulation module.

13. The wireless signal transceiver of claim 10, wherein the matching circuit comprises:
    a capacitor, coupled between the first end of the transmission line and a ground end; and
    an inductor, having one end coupled to the first end of the transmission line and the capacitor, and the other end coupled to the second end of the transmission line, the first filtering circuit and the second filtering circuit.

14. The wireless signal transceiver of claim 10 further comprising a filtering circuit, coupled between the reception antenna and the first end of the transmission line.

15. The wireless signal transceiver of claim 14, wherein the filtering circuit is a capacitor.

16. The wireless signal transceiver of claim 10 further comprising a filtering circuit, coupled between the transmission antenna and the first end of the transmission line.

17. The wireless signal transceiver of claim 16, wherein the filtering circuit comprises:
    a capacitor, coupled between the transmission antenna and a ground end; and
    an inductor, having one end coupled to the first end of the transmission line, and the other end coupled to the transmission antenna and the capacitor.

18. The wireless signal transceiver of claim 10, wherein the first wireless signal is a satellite radio signal and the second wireless signal is a frequency modulation broadcast signal.

* * * * *